(No Model.) 2 Sheets—Sheet 1.
C. McNEAL.
SPLIT PULLEY.
No. 415,920. Patented Nov. 26, 1889.
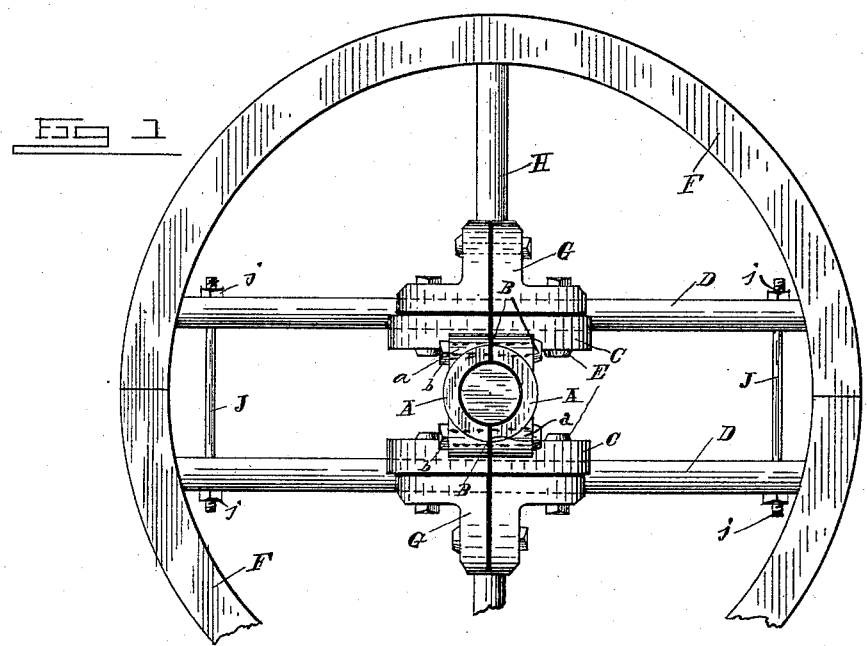
Fig. 1.
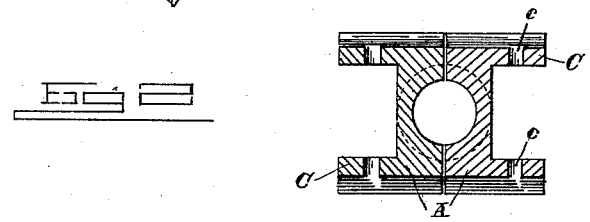
Fig. 2.
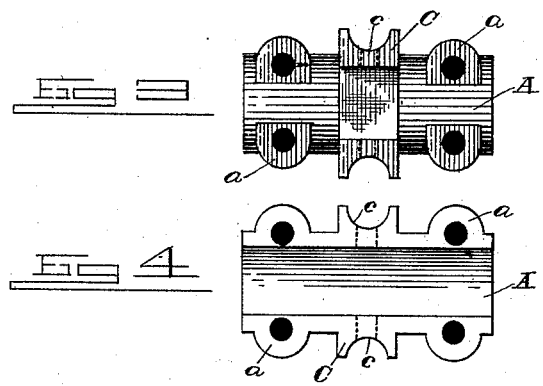
Fig. 3.
Fig. 4.
Witnesses
Chas. W. Seville
A. E. Dowell
Inventor
Charles McNeal
By his Attorney
J. A. Alexander

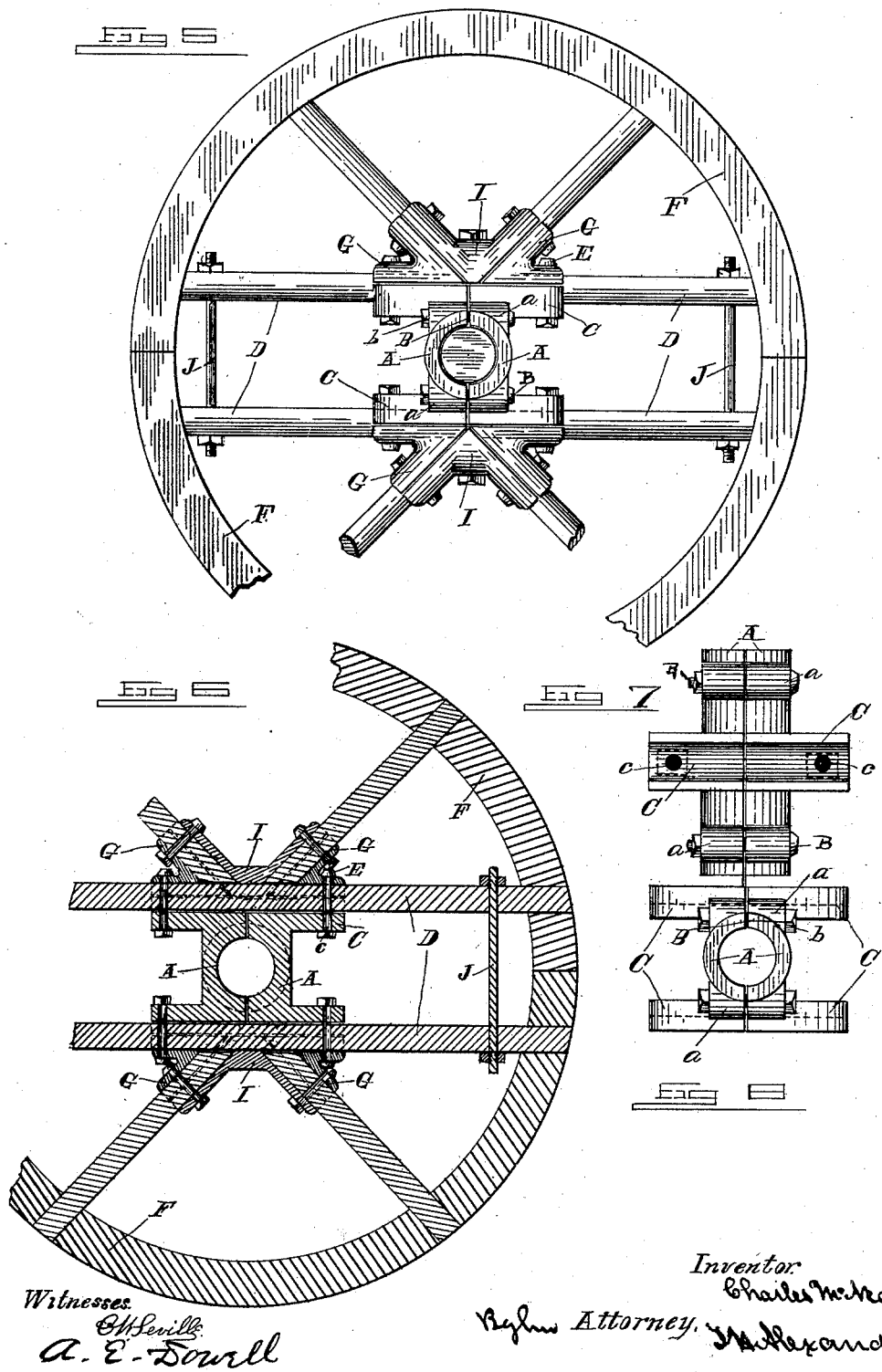

UNITED STATES PATENT OFFICE.

CHARLES McNEAL, OF MISHAWAKA, ASSIGNOR OF ONE-HALF TO EDWARD SKILLMAN, OF GOSHEN, INDIANA.

SPLIT PULLEY.

SPECIFICATION forming part of Letters Patent No. 415,920, dated November 26, 1889.

Application filed June 6, 1889. Serial No. 313,344. (No model.)

*To all whom it may concern:*

Be it known that I, CHARLES McNEAL, of Mishawaka, in the county of St. Joseph and State of Indiana, have invented certain new and useful Improvements in Split Pulleys; and I do hereby declare that the following is a full, clear, and exact description thereof, reference being had to the accompanying drawings, and to the letters of reference marked thereon, which form part of this specification, in which—

Figure 1 is a side view of my improved split pulley. Fig. 2 is a central sectional view of the hub in the circumferential plane of the wheel, and Figs. 3 and 4 are views of the hub-sections detached. Fig. 5 is a face view of a modified form of the pulley. Fig. 6 is a sectional view thereof in the circumferential plane of the wheel. Fig. 7 is a top plan view of the hub; Fig. 8, an end view thereof.

This invention is an improvement in split pulleys, its object being to provide a sectional pulley having a sectional or divisible hub for the greater convenience of mounting on shafting and for transporting, and more particularly to improve and simplify the construction of the hub of the pulley and the means of securing the spokes thereto, all of which will be hereinafter clearly set forth.

Referring to the drawings by letters, A A designate the similar but opposite halves of the hub, which is longitudinally and diametrically divided, each half or section being of general semi-cylindrical or tubular form, and when united embrace between them the shaft to which the pulley is attached. The sections are formed with offsets $a$ $a$ at their ends and at opposite sides, as shown, which are bored at right angles to the shaft and perpendicular to the line of parting of the hub, so that when the sections are placed together bolts B B may be passed through and secured by nuts $b$ $b$, firmly uniting the halves and clamping them upon the shaft. Centrally of the length but at opposite sides of each section rise bracket-pieces C C, which are concaved on their outer faces, as shown, and transversely perforated, as at $c$. The concaved faces of brackets C are perpendicular to the line of parting of the hub.

D D designate parallel spoke-bars seated at their center in the concave faces of brackets C C and firmly secured thereto by bolts E E, which pass through openings $c$ and the spoke-bars. The ends of said bars are properly attached to the rim of the pulley, which is made in halves F F, each half being attached near its ends to the ends of bars D D, as shown, the bars D D lying parallel with each other in the circumferential plane of the pulley and perpendicular to the line of parting of the hub.

G G designate angular knees formed of metal and concaved on their outer faces, as shown, each arm of the knee being perforated for the passage of bolts. As shown in Fig. 1, the concave faces of these knees are at right angles to each other and in the circumferential plane of the wheel, and one knee is placed opposite each bracket C, outside the spoke-bar, and clamped to said bracket by the bolts E, thus binding the spoke-bars D between the knees and brackets, as shown. The other arms of the brackets, as shown in Fig. 1, meet in the plane of the line of parting of the hub, and between each pair of knees is clamped the inner end of a spoke H, which lies radial to the shaft and at right angles to the bars D D. The outer ends of spokes H are properly secured to the center of the rim-sections, thus giving a six-spoke-wheel pulley.

By increasing the angularity of the knees, as shown in Figs. 5 and 6, a bifurcated block I can be introduced between each pair of knees, the outer faces of the arms of said block being concaved also, and two spoke-bars can be attached to each section, forming essentially an eight-spoked pulley or wheel, the spokes being clamped between the arms of block I and the knees, as shown.

The spoke-bars D D may be fastened together near their outer ends by tie-bolts J J and nuts $j$, as shown, to bring the ends of the rim-sections close together and to additionally clamp the spoke-bars to the hub. By this construction each spoke-bar is seated in proper channels to insure their coincidence with each other in the circumferential plane of the wheel, and each is clamped between metal surfaces and does not depend entirely upon the bolt-heads for support, and as the bolts may pass through the spokes there is no possibility of the pulley being drawn sidewise or out of plumb under heavy strain. The opposite lines of division of the rim and hub also assist in maintaining the true centering of the wheel, as there is no direct division, line through the pulley. Among other manifest advantages are the facility and ease with which the pulley can be dismantled or set up.

It will be seen that the hub proper is in but two longitudinally-divided parts, and the spoke-clamps and bolts are in the circumferential plane of the wheel, not transverse thereto, so that there is less danger of the spokes or bars breaking at the points where the bolts pass through them.

Having described my invention, I claim—

1. In a split pulley, the combination of a longitudinally-divided two-part hub, the spoke-bars secured thereto at right angles to the parting-line of the hub, the rim-sections respectively attached to said spoke-bars and parting at right angles to the line of parting of the hub, and the uniting-bolts, substantially as described.

2. The combination of the hub having concave-faced bracket-pieces at opposite sides thereof and the spoke-bars secured to said bracket-pieces with the angular knees bolted to said brackets and clamping the spoke-bars thereto and the spokes secured between said knees on opposite sides of the hub, substantially as specified.

3. The combination of the hub-sections having bracket-pieces, substantially as described, the spoke-bars, the rim-sections secured to said bars, the spokes, and the angular knees, and the securing-bolts for said spokes and spoke-bars lying in the circumferential plane of the wheel, all substantially as and for the purpose specified.

4. The combination of the hub having bracket-pieces C C projecting therefrom, substantially as described, the spoke-bars secured to said bracket-pieces, the knees secured to said brackets and clamping said bars, the spokes, and the angular blocks secured to said knees and the clamping-spokes, substantially as specified.

5. The herein-described hub, consisting of two sections united by bolts running at right angles to the bore of the hub and each having a pair of brackets concaved on their faces, formed integral therewith, and the angular knees also concaved on the outer faces of their arms and adapted to be bolted to said brackets and together to secure the spokes and bars of the pulley to the hub, substantially as described.

6. In a split pulley, the combination of the longitudinally-divided hub having concave-faced brackets, substantially as described, the spoke-bars secured to said brackets and lying at right angles to the line of parting of the hub, the rim-sections respectively attached to said spoke-bars and parting at right angles to the parting-line of the hub, and the spokes clamped between said knees, all substantially as set forth.

7. The combination of the hub having concaved bracket-pieces, the angular knees bolted to said bracket-pieces, and the bifurcated blocks bolted between and to said knees with the spoke-bars clamped between said knees and brackets, the spokes clamped between said knees and bifurcated blocks, the rim-sections, and the uniting bolts and nuts, all substantially as and for the purpose set forth.

In testimony that I claim the foregoing as my own I affix my signature in presence of two witnesses.

CHARLES McNEAL.

Witnesses:
 NIMROD PRICKETT,
 ALBERT GAYLOR.